United States Patent
Kroner et al.

(10) Patent No.: US 9,707,719 B2
(45) Date of Patent: Jul. 18, 2017

(54) AESTHETIC HOUSING

(71) Applicant: MakerBot Industries, LLC, Brooklyn, NY (US)

(72) Inventors: Matthew Ryan Kroner, Brooklyn, NY (US); Neil Joseph Hickey, Brooklyn, NY (US); John Michael Briscella, Brooklyn, NY (US); John S. Dimatos, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 541 days.

(21) Appl. No.: 14/067,264

(22) Filed: Oct. 30, 2013

(65) Prior Publication Data

US 2014/0129020 A1 May 8, 2014

Related U.S. Application Data

(63) Continuation of application No. 13/962,793, filed on Aug. 8, 2013.

(60) Provisional application No. 61/680,989, filed on Aug. 8, 2012.

(51) Int. Cl.
| | | |
|---|---|---|
| *B29C 67/00* | (2006.01) | |
| *G06F 17/50* | (2006.01) | |
| *H04N 1/00* | (2006.01) | |
| *B33Y 50/00* | (2015.01) | |

(52) U.S. Cl.
CPC ...... *B29C 67/0088* (2013.01); *B29C 67/0051* (2013.01); *B29C 67/0055* (2013.01); *G06F 17/5009* (2013.01); *H04N 1/00827* (2013.01); *B33Y 50/00* (2014.12); *Y02T 10/82* (2013.01)

(58) Field of Classification Search
None
See application file for complete search history.

(56) References Cited

U.S. PATENT DOCUMENTS

| | | | |
|---|---|---|---|
| 5,793,648 A * | 8/1998 | Nagle | G06F 17/509 |
| | | | 700/182 |
| 6,564,112 B1 * | 5/2003 | Factor | G05B 19/41865 |
| | | | 700/95 |
| 6,760,488 B1 | 7/2004 | Moura et al. | |
| 8,170,302 B1 | 5/2012 | Gleason et al. | |
| 8,412,588 B1 * | 4/2013 | Bodell | G06Q 10/06 |
| | | | 700/119 |
| 2002/0166220 A1 | 11/2002 | Imundo et al. | |
| 2003/0105538 A1 | 6/2003 | Wooten et al. | |
| 2004/0043806 A1 * | 3/2004 | Kirby | A62F 13/005 |
| | | | 463/6 |
| 2005/0025354 A1 | 2/2005 | Macy et al. | |
| 2005/0058573 A1 | 3/2005 | Frost et al. | |
| 2005/0157919 A1 | 7/2005 | Di Santo et al. | |
| 2006/0100934 A1 * | 5/2006 | Burr | G06Q 10/06 |
| | | | 705/26.81 |

(Continued)

OTHER PUBLICATIONS

U.S. Appl. No. 14/067,427, Non-Final Office Action mailed May 12, 2016, 22 pages.

(Continued)

*Primary Examiner* — Sean Shechtman
(74) *Attorney, Agent, or Firm* — Strategic Patents, P.C.

(57) ABSTRACT

A variety of techniques are disclosed for customizing a digital model of an aesthetic housing to receive a functional component and an interface component for the functional component.

20 Claims, 9 Drawing Sheets

(56) References Cited

U.S. PATENT DOCUMENTS

| | | |
|---|---|---|
| 2006/0293906 A1 | 12/2006 | Wilson et al. |
| 2007/0084047 A1 | 4/2007 | Lange et al. |
| 2007/0098929 A1 | 5/2007 | Dietrich et al. |
| 2008/0120086 A1* | 5/2008 | Lilley .................... G06F 17/50 703/21 |
| 2009/0017714 A1 | 1/2009 | DeRennaux et al. |
| 2009/0177309 A1 | 7/2009 | Kozlak |
| 2011/0087350 A1 | 4/2011 | Fogel et al. |
| 2011/0099810 A1 | 5/2011 | Stankowski et al. |
| 2012/0095732 A1 | 4/2012 | Fisker et al. |
| 2012/0198676 A1 | 8/2012 | Rickenbacher et al. |
| 2013/0044190 A1 | 2/2013 | Hu et al. |
| 2013/0189435 A1 | 7/2013 | MacKie et al. |
| 2013/0220570 A1 | 8/2013 | Sears et al. |
| 2013/0297062 A1 | 11/2013 | Lacaze et al. |
| 2014/0023996 A1 | 1/2014 | Finn et al. |
| 2014/0039663 A1 | 2/2014 | Boyer et al. |
| 2014/0046473 A1 | 2/2014 | Boynton et al. |
| 2014/0129021 A1 | 5/2014 | Boynton et al. |
| 2014/0129022 A1 | 5/2014 | Briscella et al. |
| 2014/0214684 A1 | 7/2014 | Pell et al. |
| 2014/0228860 A1 | 8/2014 | Steines et al. |
| 2014/0244433 A1 | 8/2014 | Cruz et al. |

OTHER PUBLICATIONS

"U.S. Appl. No. 13/962,793, Non-Final Office Action mailed Mar. 22, 2016", 21 pages.

"U.S. Appl. No. 14/067,043, Non-Final Office Action mailed Apr. 19, 2016", 17 pages.

"3D FUNPOD", http://phlatboyz.blogspot.com/2012/02/3d-printed-micro-3d-3d-funpod-3d-funpod.html NPL-19 Feb. 8, 2012, pp. 1-3.

"Ultra-Bot 3D Printer, William Steele", http://www.kickstarter.com/projects/wjsteele/ultra-bot-3d-printer/posts/362119 Dec. 4, 2012, pp. 1-17.

"U.S. Appl. No. 13/653,559, Final Office Action mailed Feb. 1, 2016", 21 Pages.

"U.S. Appl. No. 13/653,559, Non-Final Office Action mailed Jun. 30, 2016", 23 pages.

"U.S. Appl. No. 13/653,559, Non-Final Office Action mailed Sep. 18, 2015", 24 pages.

"U.S. Appl. No. 14/067,043 Final Office Action mailed Nov. 17, 2016", 19 pages.

"U.S. Appl. No. 14/067,427 Final Office Action mailed Nov. 14, 2016", 24 pages.

"U.S. Appl. No. 13/962,793, Final Office Action mailed Oct. 5, 2016", 19 pages.

"U.S. Appl. No. 13/653,559 Final Office Action mailed Nov. 2, 2016", 22 pages.

* cited by examiner

AESTHETIC HOUSING

RELATED APPLICATIONS

This application is a continuation of U.S. patent application Ser. No. 13/962,793 filed on Aug. 8, 2013, which claims the benefit of U.S. Prov. App. No. 61/680,989 filed on Aug. 8, 2012, each of which is hereby incorporated by reference in its entirety.

BACKGROUND

The proliferation of three-dimensional printers and other rapid prototyping tools has placed substantial fabrication capabilities in the hands of consumers. However, there remains a need for consumer-oriented applications of this hardware. In particular, there remains a need for automated tools to simplify consumer-level design and fabrication of three-dimensional objects.

SUMMARY

A variety of computer automated tools are disclosed to assist consumers with using three-dimensional printers. Where a user also has access to a three-dimensional scanner, the tools may also support automated modifications to scanned subject matter.

BRIEF DESCRIPTION OF THE FIGURES

The invention and the following detailed description of certain embodiments thereof may be understood by reference to the following figures.

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The following description emphasizes three-dimensional printers using fused deposition modeling or similar techniques where a bead of material is extruded in a layered series of two dimensional patterns as "roads," "paths" or the like to form a three-dimensional object from a digital model. It will be understood, however, that numerous additive fabrication techniques are known in the art including without limitation multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer", "three-dimensional printer", "fabrication system", and so forth, unless a more specific meaning is explicitly provided or otherwise clear from the context.

Further, it should be appreciated that three-dimensional printers, three-dimensional scanners, and a variety of three-dimensional modeling techniques are known in the art. The following description emphasizes applications of these various technologies to consumer-level use of three-dimensional printers rather than various technical details that are known in the art.

Figure 1:
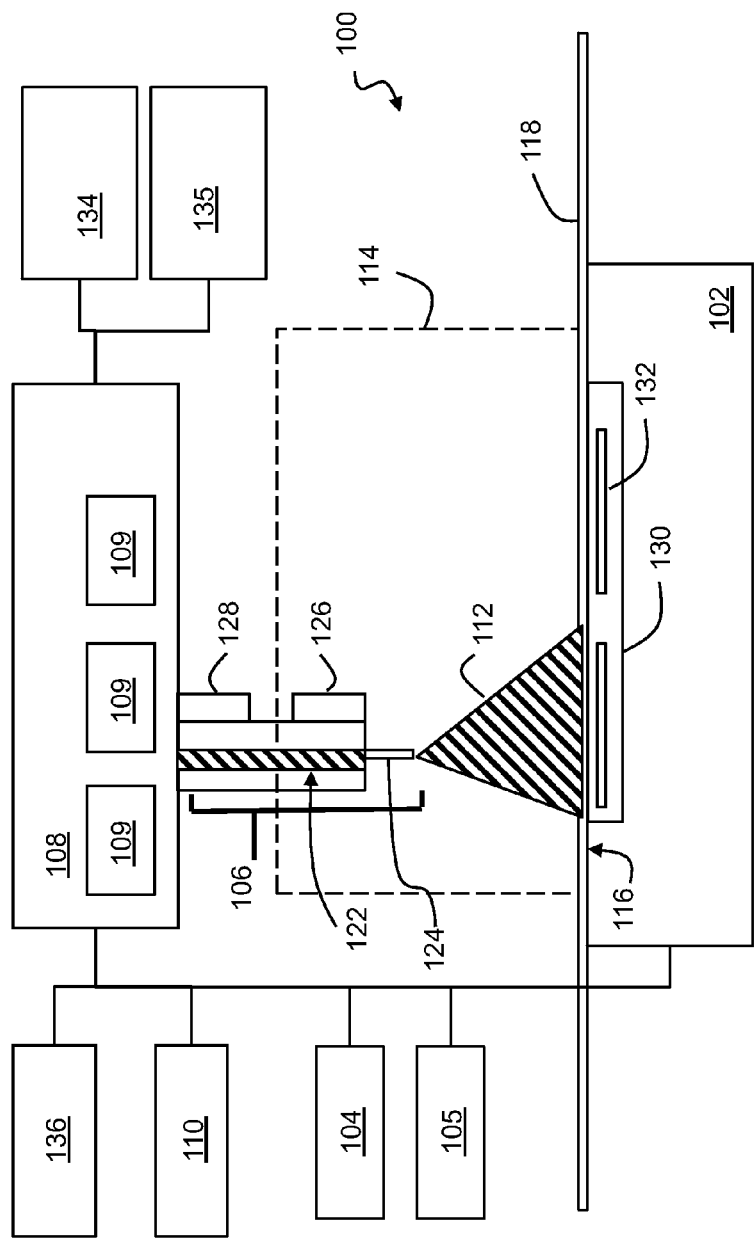
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable platform on which to build the object 112. The build platform 102 may include a thermal element 130 that controls the temperature of the build platform 102 through one or more active devices 132, such as resistive elements that convert electrical current into heat, Peltier effect devices that can create a heating or cooling effect, or any other thermoelectric heating and/or cooling devices. The thermal element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 (also referred to as a heating element) to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder 106 within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. For example, in one aspect the build platform 102 may be coupled to one or more threaded rods by a threaded nut so that the threaded rods can be rotated to provide z-axis positioning of the build platform 102 relative to the extruder 106. This arrangement may advantageously simplify design and improve accuracy by permitting an x-y positioning mechanism for the extruder 106 to be fixed relative to a build volume. Any such arrangement suitable for controllably positioning the extruder 106 within the working volume 114 may be adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically or otherwise coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the printer 100 such as an on-board processor. In another aspect, this may be a processor associated with a personal computer or other computing device coupled to the printer 100, e.g., through a wired or wireless connection. Similarly, various functions described herein may be allocated between an on-board processor for the printer 100 and a separate computer. All such computing devices and environments are intended to fall within the meaning of the term "controller" or "processor" as used herein, unless a different meaning is explicitly provided or otherwise clear from the context.

A variety of additional sensors and other components may be usefully incorporated into the printer 100 described above. These other components are generically depicted as other hardware 134, 135, 136 in FIG. 1, for which the positioning and mechanical/electrical interconnections with other elements of the printer 100 will be readily understood and appreciated by one of ordinary skill in the art. The other hardware 134, 135, 136 may include a temperature sensor positioned to sense a temperature of the surface of the build platform 102, the extruder 126, or any other system components. This may, for example, include a thermistor or the like embedded within or attached below the surface of the build platform 102. This may also or instead include an infrared detector or the like directed at the surface 116 of the build platform 102.

In another aspect, the other hardware 134, 135, 136 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100.

The other hardware 134, 135, 136 may also or instead include a heating element (instead of or in addition to the thermal element 130) to heat the working volume such as a radiant heater or forced hot air heater to maintain the object 112 at a fixed, elevated temperature throughout a build, or the other hardware 134, 135, 136 may include a cooling element to cool the working volume.

Figure 2:
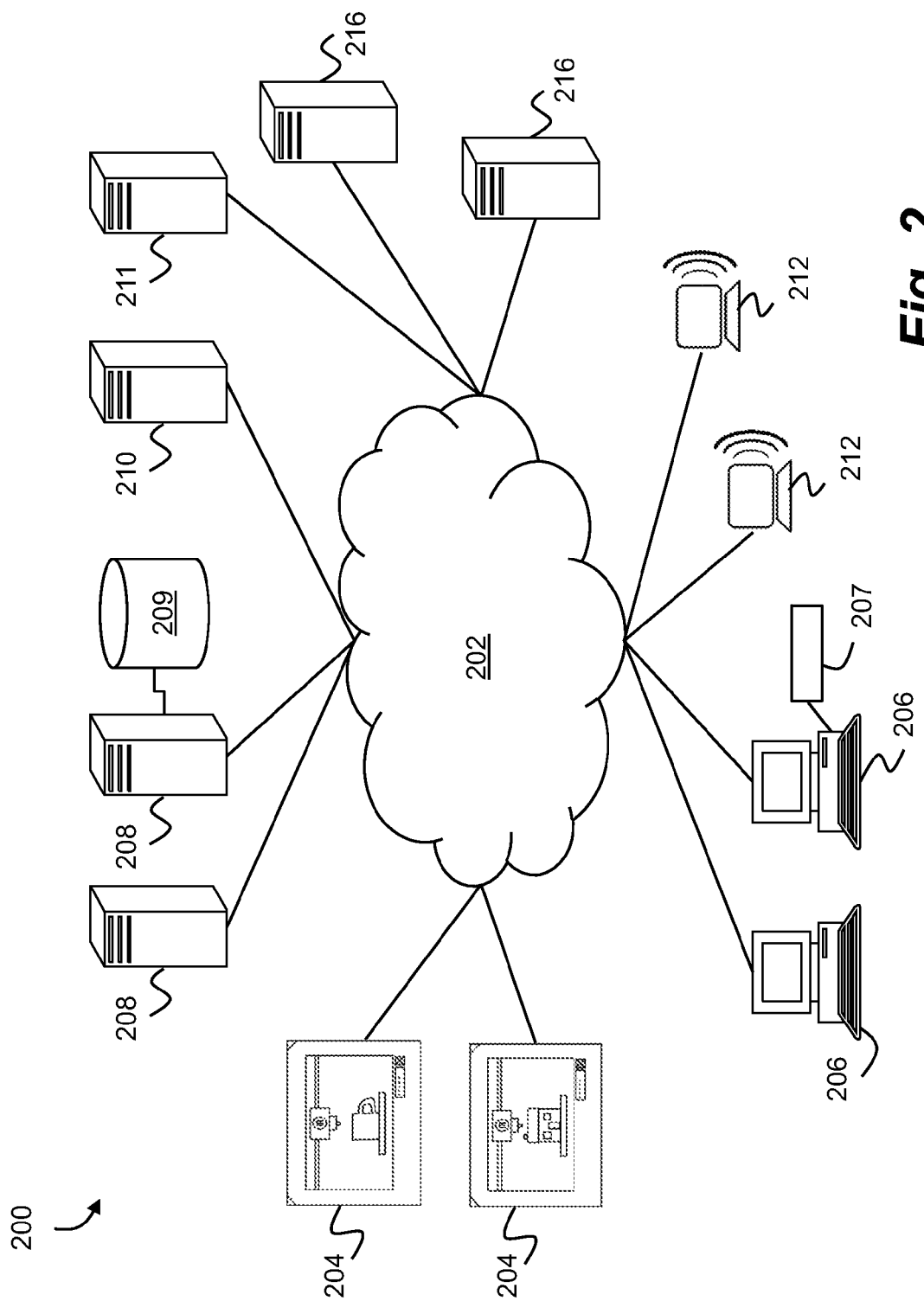
FIG. 2 depicts a networked three-dimensional printing environment.

FIG. 2 depicts a networked three-dimensional printing environment. In general, the environment 200 may include a data network 202 interconnecting a plurality of participating devices in a communicating relationship. The participating devices may, for example, include any number of three-dimensional printers 204 (also referred to interchangeably herein as "printers"), client devices 206, print servers 208, content sources 210, mobile devices 212, and other resources 216.

The data network 202 may be any network(s) or inter-network(s) suitable for communicating data and control information among participants in the environment 200. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMax-Advanced (IEEE 802.16m)) and/or other technologies, as well as any of a variety of corporate area or local area networks and other switches, routers, hubs, gateways, and the like that might be used to carry data among participants in the environment 200.

The three-dimensional printers 204 may be any computer-controlled devices for three-dimensional fabrication, including without limitation any of the three-dimensional printers or other fabrication or prototyping devices described above. In general, each such device may include a network interface comprising, e.g., a network interface card, which term is used broadly herein to include any hardware (along with software, firmware, or the like to control operation of same) suitable for establishing and maintaining wired and/or wireless communications. The network interface card may include without limitation wired Ethernet network interface cards ("NICs"), wireless 802.11 networking cards, wireless 802.11 USB devices, or other hardware for wireless local area networking. The network interface may also or instead include cellular network hardware, wide area wireless network hardware or any other hardware for centralized, ad hoc, peer-to-peer, or other radio communications that might be used to carry data. In another aspect, the network interface may include a serial or USB port to directly connect to a computing device such as a desktop computer that, in turn, provides more general network connectivity to the data network 202.

The printers 204 might be made to fabricate any object, practical or otherwise, that is amenable to fabrication according to each printer's capabilities. This may be a model of a house or a tea cup, as depicted, or any other object such as gears or other machine hardware, replications of scanned three-dimensional objects, or fanciful works of art.

Client devices 206 may be any devices within the environment 200 operated by users to initiate, manage, monitor, or otherwise interact with print jobs at the three-dimensional printers 204. This may include desktop computers, laptop computers, network computers, tablets, or any other computing device that can participate in the environment 200 as contemplated herein. Each client device 206 generally provides a user interface, which may include a graphical user interface, a text or command line interface, a voice-controlled interface, and/or a gesture-based interface to control operation of remote three-dimensional printers 204. The user interface may be maintained by a locally executing application on one of the client devices 206 that receives data and status information from, e.g., the printers 204 and print servers 208 concerning pending or executing print jobs. The user interface may create a suitable display on the client device 206 for user interaction. In other embodiments, the user interface may be remotely served and presented on one of the client devices 206, such as where a print server 208 or one of the three-dimensional printers 204 includes a web server that provides information through one or more web pages or the like that can be displayed within a web browser or similar client executing on one of the client devices 206. In one aspect, the user interface may include a voice controlled interface that receives spoken commands from a user and/or provides spoken feedback to the user.

A client device 206 may, for example include a removable memory device 207 such as a USB drive, memory stick, or the like, which may be used for example to transfer digital models of three-dimensional objects to printers 204.

The print servers 208 may include data storage, a network interface, and a processor and/or other processing circuitry. In the following description, where the functions or configuration of a print server 208 are described, this is intended to include corresponding functions or configuration (e.g., by programming) of a processor of the print server 208. In general, the print servers 208 (or processors thereof) may perform a variety of processing tasks related to management of networked printing. For example, the print servers 208 may manage print jobs received from one or more of the client devices 206, and provide related supporting functions such as content search and management. A print server 208 may also include a web server that provides web-based access by the client devices 206 to the capabilities of the print server 208. A print server 208 may also communicate periodically with three-dimensional printers 204 in order to obtain status information concerning, e.g., availability of printers and/or the status of particular print jobs, any of which may be subsequently presented to a user through the web server or any other suitable interface. A print server 208 may also maintain a list of available three-dimensional printers 204, and may automatically select one of the three-dimensional printers 204 for a user-submitted print job, or may permit a user to specify a single printer, or a group of preferred printers, for fabricating an object. Where the print server 208 selects the printer automatically, any number of criteria may be used such as geographical proximity, printing capabilities, current print queue, fees (if any) for use of a particular three-dimensional printer 204, and so forth. Where the user specifies criteria, this may similarly include any relevant aspects of three-dimensional printers 204, and may permit use of absolute criteria (e.g., filters) or preferences, which may be weighted preferences or unweighted preferences, any of which may be used by a print server 208 to allocate a print job to a suitable resource.

In one aspect, the print server 208 may be configured to support interactive voice control of one of the printers 204. For example, the print server 208 may be configured to receive a voice signal (e.g., in digitized audio form) from a microphone or other audio input of the printer 204, and to process the voice signal to extract relevant content such as a command for the printer. Where the command is recognized as a print command, the voice signal may be further processed to extract additional context or relevant details. For example, the voice signal may be processed to extract an object identifier that specifies an object for printing, e.g., by filename, file metadata, or semantic content. The voice signal may also be processed to extract a dimensional specification, such as a scale or absolute dimension for an object. The print server 208 may then generate suitable control signals for return to the printer 204 to cause the printer 204 to fabricate the object. Where an error or omission is detected, the print server 208 may return a request for clarification to the printer 204, which may render the request in spoken form through a speaker, or within a user interface of the printer 204 or an associated device.

Other user preferences may be usefully stored at the print server 208 to facilitate autonomous, unsupervised fabrication of content from content sources 210. For example, a print server 208 may store a user's preference on handling objects greater than a build volume of a printer. These preferences may control whether to resize the object, whether to break the object into multiple sub-objects for fabrication, and whether to transmit multiple sub-objects to a single printer or multiple printers. In addition, user preferences or requirements may be stored, such as multi-color printing capability, build material options and capabilities, and so forth. More generally, a print queue (which may be a printer-specific or user-specific queue, and which may be hosted at a printer 204, a server 208, or some combination of these) may be managed by a print server 208 according to one or more criteria from a remote user requesting a print job. The print server 208 may also store user preferences or criteria for filtering content, e.g., for automatic printing or other handling. While this is described below as a feature for autonomous operation of a printer (such as a printer that locally subscribes to a syndicated model source), any criteria that can be used to identify models of potential interest by explicit type (e.g., labeled in model metadata), implicit type (e.g., determined based on analysis of the model), source, and so forth, may be provided to the print server 208 and used to automatically direct new content to one or more user-specified ones of the three-dimensional printers 204.

In one aspect, the processor of the print server may be configured to store a plurality of print jobs submitted to the web server in a log and to provide an analysis of print activity based on the log. This may include any type of analysis that might be useful to participants in the environment 200. For example, the analysis may include tracking of the popularity of particular objects, or of particular content sources. The analysis may include tracking of which three-dimensional printers 204 are most popular or least popular, or related statistics such as the average backlog of pending print jobs at a number of the three-dimensional printers 204. The analysis may include success of a particular printer in fabricating a particular model or of a particular printer in completing print jobs generally. More generally, any statistics or data may be obtained, and any analysis may be performed, that might be useful to users (e.g., when requesting prints), content sources (e.g., when choosing new printable objects for publication), providers of fabrication resources (e.g., when setting fees), or network facilitators such as the print servers 208.

A print server 208 may also maintain a database 209 of content, along with an interface for users at client devices 206 to search the database 209 and request fabrication of objects in the database 209 using any of the three-dimensional printers 204. Thus in one aspect, a print server 208 (or any system including the print server 208) may include a database 209 of three-dimensional models, and the print server 208 may act as a server that provides a search engine for locating a particular three-dimensional model in the database 209. The search engine may be a text-based search engine using keyword text queries, plain language queries, and so forth. The search engine may also or instead include an image-based search engine configured to identify three-dimensional models similar to a two-dimensional or three-dimensional image provide by a user.

In another aspect, the printer server 208 may periodically search for suitable content at remote locations on the data network, which content may be retrieved to the database 209, or have its remote location (e.g., a URL or other network location identifier) stored in the database 209. In another aspect, the print server 208 may provide an interface for submission of objects from remote users, along with any suitable metadata such as a title, tags, creator information, descriptive narrative, pictures, recommended printer settings, and so forth. In one aspect, the database 209 may be manually curated according to any desired standards. In another aspect, printable objects in the database 209 may be manually or automatically annotated according to content type, popularity, editorial commentary, and so forth.

The print server 208 may more generally provide a variety of management functions. For example, the print server 204 may store a location of a predetermined alternative three-dimensional printer to execute a print job from a remote user in the event of a failure by the one of the plurality of three-dimensional printers 204. In another aspect, the print server 208 may maintain exclusive control over at least one of the plurality of three-dimensional printers 204, such that other users and/or print servers cannot control the printer. In another aspect, the print server 208 may submit a print job to a first available one of the plurality of three-dimensional printers 204.

In another aspect, a print server 208 may provide an interface for managing subscriptions to sources of content. This may include tools for searching existing subscriptions, locating or specifying new sources, subscribing to sources of content, and so forth. In one aspect, a print server 208 may manage subscriptions and automatically direct new content from these subscriptions to a three-dimensional printer 204 according to any user-specified criteria. Thus while it is contemplated that a three-dimensional printer 204 may autonomously subscribe to sources of content through a network interface and receive new content directly from such sources, it is also contemplated that this feature may be maintained through a remote resource such as a print server 208.

A print server 208 may maintain print queues for participating three-dimensional printers 204. This approach may advantageously alleviate backlogs at individual printers 204, which may have limited memory capacity for pending print jobs. More generally, a print server 208 may, by communicating with multiple three-dimensional printers 204, obtain a view of utilization of multiple networked resources that permits a more efficient allocation of print jobs than would be possible through simple point-to-point communications among users and printers. Print queues may also be published by a print server 208 so that users can view pending queues for a variety of different three-dimensional printers 204 prior to selecting a resource for a print job. In one aspect, the print queue may be published as a number of print jobs and size of print jobs so that a requester can evaluate likely delays. In another aspect, the print queue may be published as an estimated time until a newly submitted print job can be initiated.

In one aspect, the print queue of one of the print servers 208 may include one or more print jobs for one of the plurality of three-dimensional printers 204. The print queue may be stored locally at the one of the plurality of three-dimensional printers. In another aspect, the print queue may be allocated between the database 209 and a local memory of the three-dimensional printer 204. In another aspect, the print queue may be stored, for example, in the database 209 of the print server 208. As used here, the term 'print queue' is intended to include print data (e.g., the three-dimensional model or tool instructions to fabricate an object) for a number of print job (which may be arranged for presentation in order of expected execution), as well as any metadata concerning print jobs. Thus, a portion of the print queue such as the metadata (e.g., size, status, time to completion) may be usefully communicated to a print server 208 for sharing among users while another portion of the print queue such as the model data may be stored at a printer in preparation for execution of a print job.

Print queues may implement various user preferences on prioritization. For example, for a commercial enterprise, longer print jobs may be deferred for after normal hours of operation (e.g., after 5:00 p.m.), while shorter print jobs may be executed first if they can be completed before the end of a business day. In this manner, objects can be identified and fabricated from within the print queue in a manner that permits as many objects as possible to be fabricated before a predetermined closing time. Similarly, commercial providers of fabrication services may charge explicitly for prioritized fabrication, and implement this prioritization by prioritizing print queues in a corresponding fashion.

In another aspect, a print server 208 may provide a virtual workspace for a user. In this virtual workspace, a user may search local or remote databases of printable objects, save objects of interest (or links thereto), manage pending prints, specify preferences for receiving status updates (e.g., by electronic mail or SMS text), manage subscriptions to content, search for new subscription sources, and so forth. In one aspect, the virtual workspace may be, or may include, web-based design tools or a web-based design interface that permits a user to create and modify models. In one aspect, the virtual workspace may be deployed on the web, while permitting direct fabrication of a model developed within that environment on a user-specified one of the three-dimensional printers 204, thus enabling a web-based design environment that is directly coupled to one or more fabrication resources.

The content sources 210 may include any sources of content for fabrication with a three-dimensional printer 204. This may, for example, include databases of objects accessible through a web interface or application programming interface. This may also or instead include individual desktop computers or the like configured as a server for hosted access, or configured to operate as a peer in a peer-to-peer network. This may also or instead include content subscription services, which may be made available in an unrestricted fashion, or may be made available on a paid subscription basis, or on an authenticated basis based upon some other relationship (e.g., purchase of a related product or a ticket to an event). It will be readily appreciated that any number of content providers may serve as content sources 210 as contemplated herein. By way of non-limiting example, the content sources 210 may include destinations such as amusement parks, museums, theaters, performance venues, or the like, any of which may provide content related to users who purchase tickets. The content sources 210 may include manufacturers such as automobile, computer, consumer electronics, or home appliance manufacturers, any of which may provide content related to upgrades, maintenance, repair, or other support of existing products that have been purchased. The content sources 210 may include artists or other creative enterprises that sell various works of interest. The content sources 210 may include engineering or architectural firms that provide marketing or advertising pieces to existing or prospective customers. The content sources 210 may include marketing or advertising firms that provide promotional items for clients. More generally, the content sources 210 may be any individual or enterprise that provides single or serial objects for fabrication by the three-dimensional printers 204 described herein.

One or more web servers 211 may provide web-based access to and from any of the other participants in the environment 200. While depicted as a separate network entity, it will be readily appreciated that a web server 211 may be logically or physically associated with one of the other devices described herein, and may, for example, provide a user interface for web access to one of the three-dimensional printers 204, one of the print servers 208 (or databases 209 coupled thereto), one of the content sources 210, or any of the other resources 216 described below in a manner that permits user interaction through the data network 202, e.g., from a client device 206 or mobile device 212.

The mobile devices 212 may be any form of mobile device, such as any wireless, battery-powered device, that might be used to interact with the networked printing environment 200. The mobile devices 212 may, for example, include laptop computers, tablets, thin client network computers, portable digital assistants, messaging devices, cellular phones, smart phones, portable media or entertainment devices, and so forth. In general, mobile devices 212 may be operated by users for a variety of user-oriented functions such as to locate printable objects, to submit objects for printing, to monitor a personally owned printer, and/or to monitor a pending print job. A mobile device 212 may include location awareness technology such as Global Positioning System ("GPS"), which may obtain information that can be usefully integrated into a printing operation in a variety of ways. For example, a user may select an object for printing and submit a model of the object to a print server, such as any of the print servers described above. The print server may determine a location of the mobile device 212 initiating the print job and locate a closest printer for fabrication of the object.

In another aspect, a printing function may be location-based, using the GPS input (or cellular network triangulation, proximity detection, or any other suitable location detection techniques). For example, a user may be authorized to print a model only when the user is near a location (e.g., within a geo-fenced area or otherwise proximal to a location), or only after a user has visited a location. Thus a user may be provided with printable content based upon locations that the user has visited, or while within a certain venue such as an amusement park, museum, theater, sports arena, hotel, or the like. Similarly, a matrix barcode such as a QR code may be employed for localization.

The other resources 216 may include any other software or hardware resources that may be usefully employed in networked printing applications as contemplated herein. For example, the other resources 216 may include payment processing servers or platforms used to authorize payment for content subscriptions, content purchases, or printing resources. As another example, the other resources 216 may include social networking platforms that may be used, e.g., to share three-dimensional models and/or fabrication results according to a user's social graph. In another aspect, the other resources 216 may include certificate servers or other security resources for third party verification of identity, encryption or decryption of three-dimensional models, and so forth. In another aspect, the other resources 216 may include online tools for three-dimensional design or modeling, as well as databases of objects, surface textures, build supplies, and so forth. In another aspect, the other resources 216 may include a desktop computer or the like co-located (e.g., on the same local area network with, or directly coupled to through a serial or USB cable) with one of the three-dimensional printers 204. In this case, the other resource 216 may provide supplemental functions for the three-dimensional printer 204 in a networked printing context such as maintaining a print queue or operating a web server for remote interaction with the three-dimensional printer 204. Other resources 216 also include supplemental resources such as three-dimensional scanners, cameras, and post-processing/finishing machines or resources. More generally, any resource that might be usefully integrated into a networked printing environment may be one of the resources 216 as contemplated herein.

It will be readily appreciated that the various components of the networked printing environment 200 described above may be arranged and configured to support networked printing in a variety of ways. For example, in one aspect there is disclosed herein a networked computer with a print server and a web interface to support networked three-dimensional printing. This device may include a print server, a database, and a web server as discussed above. The print server may be coupled through a data network to a plurality of three-dimensional printers and configured to receive status information from one or more sensors for each one of the plurality of three-dimensional printers. The print server may be further configured to manage a print queue for each one of the plurality of three-dimensional printers. The database may be coupled in a communicating relationship with the print server and configured to store print queue data and status information for each one of the plurality of three-dimensional printers. The web server may be configured to provide a user interface over the data network to a remote user, the user interface adapted to present the status information and the print queue data for one or more of the plurality of three-dimensional printers to the user and the user interface adapted to receive a print job from the remote user for one of the plurality of three-dimensional printers.

The three-dimensional printer 204 described above may be configured to autonomously subscribe to syndicated content sources and periodically receive and print objects from those sources. Thus in one aspect there is disclosed herein a device including any of the three-dimensional printers described above; a network interface; and a processor (which may without limitation include the controller for the printer). The processor may be configured to subscribe to a plurality of sources of content (such as the content sources 210 described above) selected by a user for fabrication by the three-dimensional printer through the network interface. The processor may be further configured to receive one or more three-dimensional models from the plurality of content sources 210 and to select one of the one or more three-dimensional models for fabrication by the three-dimensional printer 204 according to a user preference for prioritization. The user preference may, for example, preferentially prioritize particular content sources 210, or particular types of content (e.g., tools, games, artwork, upgrade parts, or content related to a particular interest of the user).

The memory of a three-dimensional printer 204 may be configured to store a queue of one or more additional three-dimensional models not selected for immediate fabrication. The processor may be programmed to periodically re-order or otherwise alter the queue according to predetermined criteria or manual user input. For example, the processor may be configured to evaluate a new three-dimensional model based upon a user preference for prioritization, and to place the new three-dimensional model at a corresponding position in the queue. The processor may also or instead be configured to retrieve content from one of the content sources 210 by providing authorization credentials for the user, which may be stored at the three-dimensional printer or otherwise accessible for presentation to the content source 210. The processor may be configured to retrieve content from at least one of the plurality of content sources 210 by authorizing a payment from the user to a content provider. The processor may be configured to search a second group of sources of content (such as any of the content sources 210 described above) according to one or more search criteria provide by a user. This may also or instead include demographic information for the user, contextual information for the user, or any other implicit or explicit user information.

In another aspect, there is disclosed herein a system for managing subscriptions to three-dimensional content sources such as any of the content sources 210 described above. The system may include a web server configured to provide a user interface over a data network, which user interface is adapted to receive user preferences from a user including a subscription to a plurality of sources of a plurality of three-dimensional models, a prioritization of content from the plurality of sources, and an identification of one or more fabrication resources coupled to the data network and suitable for fabricating objects from the plurality of three-dimensional models. The system may also include a database to store the user preferences, and to receive and store the plurality of three-dimensional models as they are issued by the plurality of sources. The system may include a processor (e.g., of a print server 208, or alternatively of a client device 206 interacting with the print server 208) configured to select one of the plurality of three-dimensional models for fabrication based upon the prioritization. The system may include a print server configured to communicate with the one or more fabrication resources through the data network, to determine an availability of the one or more fabrication resources, and to transmit the selected one of the plurality of three-dimensional models to one of the one or more fabrication resources.

In another aspect, there is disclosed herein a network of three-dimensional printing resources comprising a plurality of three-dimensional printers, each one of the plurality of three-dimensional printers including a network interface; a server configured to manage execution of a plurality of print jobs by the plurality of three-dimensional printers; and a data network that couples the server and the plurality of three-dimensional printers in a communicating relationship.

In general as described above, the server may include a web-based user interface configured for a user to submit a new print job to the server and to monitor progress of the new print job. The web-based user interface may permit video monitoring of each one of the plurality of three-dimensional printers, or otherwise provide information useful to a remote user including image-based, simulation-based, textual-based or other information concerning status of a current print. The web-based user interface may include voice input and/or output for network-based voice control of a printer.

The fabrication resources may, for example, include any of the three-dimensional printers 204 described above. One or more of the fabrication resources may be a private fabrication resource secured with a credential-based access system. The user may provide, as a user preference and prior to use of the private fabrication resource, credentials for accessing the private fabrication resource. In another aspect, the one or more fabrication resources may include a commercial fabrication resource. In this case the user may provide an authorization to pay for use of the commercial fabrication resource in the form of a user preference prior to use of the commercial fabrication resource.

Many current three-dimensional printers require significant manufacturing time to fabricate an object. At the same time, certain printers may include a tool or system to enable multiple, sequential object prints without human supervision or intervention, such as a conveyor belt. In this context, prioritizing content may be particularly important to prevent crowding out of limited fabrication resources with low priority content that arrives periodically for autonomous fabrication. As a significant advantage, the systems and methods described herein permit prioritization using a variety of user-specified criteria, and permit use of multiple fabrication resources in appropriate circumstances. Thus prioritizing content as contemplated herein may include any useful form of prioritization. For example, this may include prioritizing the content according to source. The content sources 210 may have an explicit type that specifies the nature of the source (e.g., commercial or paid content, promotional content, product support content, non-commercial) or the type of content provided (e.g., automotive, consumer electronics, radio control hobbyist, contest prizes, and so forth). Prioritizing content may include prioritizing the content according to this type. The three-dimensional models themselves may also or instead include a type (e.g., tool, game, home, art, jewelry, replacement part, upgrade part, etc.) or any other metadata, and prioritizing the content may includes prioritizing the content according to this type and/or metadata.

In one aspect, the processor may be configured to select two or more of the plurality of three-dimensional models for concurrent fabrication by two or more of the plurality of fabrication resources based upon the prioritization when a priority of the two or more of the plurality of three-dimensional models exceeds a predetermined threshold. That is, where particular models individually have a priority above the predetermined threshold, multiple fabrication resources may be located and employed to fabricate these models concurrently. The predetermined threshold may be evaluated for each model individually, or for all of the models collectively such as on an aggregate or average basis.

In one aspect, the processor may be configured to adjust prioritization based upon a history of fabrication when a number of objects fabricated from one of the plurality of sources exceeds a predetermined threshold. Thus, for example, a user may limit the number of objects fabricated from a particular source, giving subsequent priority to content from other sources regardless of an objectively determined priority for a new object from the particular source. This prevents a single source from overwhelming a single fabrication resource, such as a personal three-dimensional printer operated by the user, in a manner that crowds out other content from other sources of possible interest. At the same time, this may enable content sources 210 to publish on any convenient schedule, without regard to whether and how subscribers will be able to fabricate objects.

In another aspect, the processor may be configured to identify one or more additional sources of content based upon a similarity to one of the plurality of sources of content. For example, where a content source 210 is an automotive manufacturer, the processor may perform a search for other automotive manufactures, related parts suppliers, mechanics, and so forth. The processor may also or instead be configured to identify one or more additional sources of content based upon a social graph of the user. This may, for example, include analyzing a social graph of relationships from the user to identify groups with common interests, shared professions, a shared history of schools or places of employment, or a common current or previous residence location, any of which may be used to locate other sources of content that may be of interest to the user.

Figure 3:
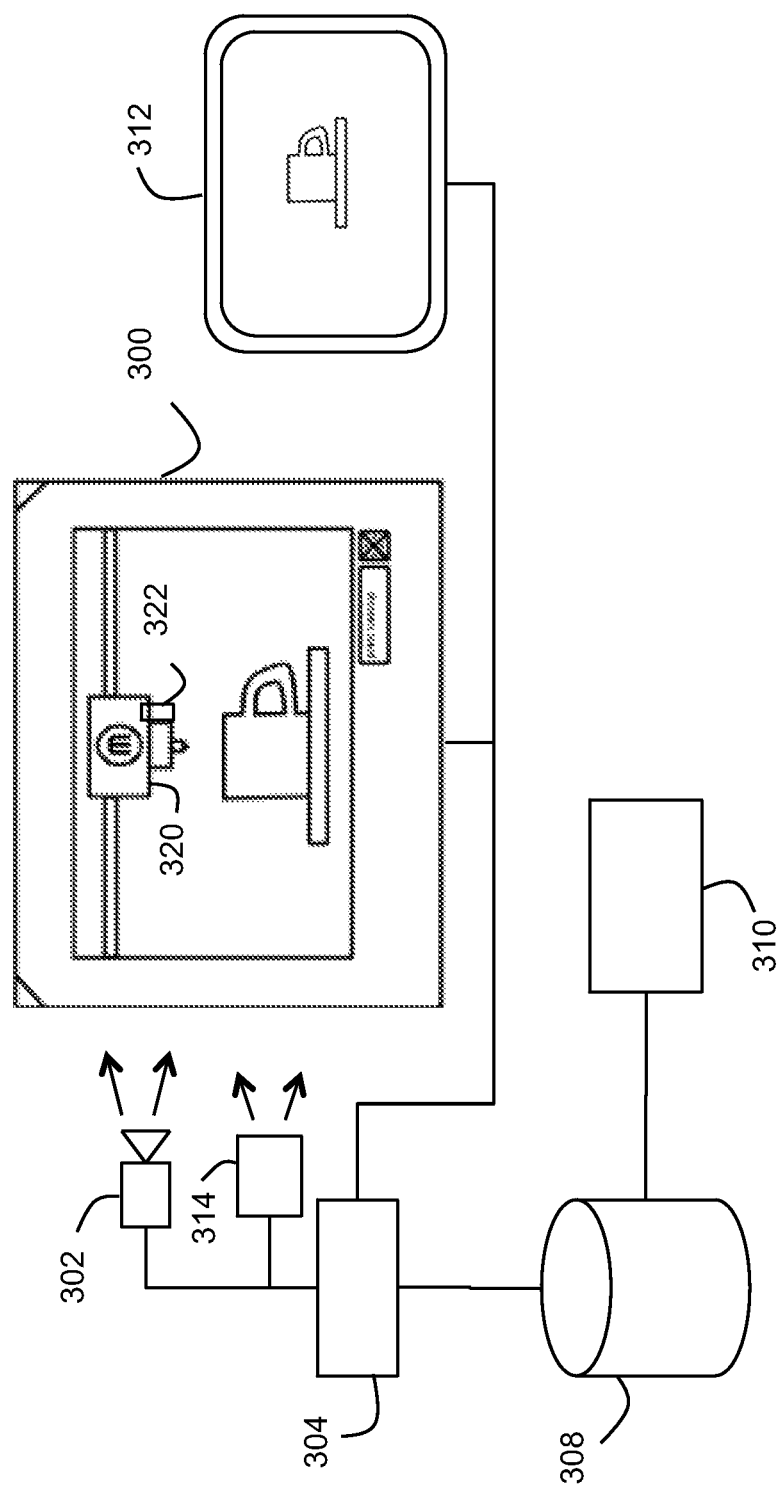
FIG. 3 shows a three-dimensional printer with a three-dimensional scanner.

FIG. 3 shows a three-dimensional printer. The printer 300, which may be any of the printers described above, may include a camera 302 and a processor 304. The camera 302 may be any digital still camera, video camera, or other image sensor(s) positioned to capture images of the printer 300, or the working volume of the printer 300.

The processor 304, which may be an internal processor of the printer 300, an additional processor provided for augmented operation as contemplated herein, a processor of a desktop computer or the like locally coupled to the printer 300, a server or other processor coupled to the printer 300 through a data network, or any other processor or processing circuitry. In general, the processor 304 may be configured to control operation of the printer 300 to fabricate an object from a build material. The processor 304 may be further configured to adjust a parameter of the printer 300 based upon an analysis of the object in the image. It should be appreciated that the processor 304 may include a number of different processors cooperating to perform the steps described herein, such as where an internal processor of the printer 300 controls operation of the printer 300 while a connected processor of a desktop computer performs image processing used to control print parameters.

The printer may include a memory 308 such as a local memory or a remote storage device that stores a log of data for an object being fabricated including without limitation a value or one or more of the parameters described above, or any other data relating to a print. The memory 308 may also or instead store a log of data aggregated from a number of fabrications of a particular object, which may include data from the printer 300 and/or data from a number of other three-dimensional printers. The memory 308 may also or instead store scan data from a three-dimensional scan, processed versions of the scan, and related metadata and the like.

A second processor 310, such as a processor on a server or other remote processing resource, may be configured to access data stored in the memory 308 and process the data in any suitable manner. The printer 300 may optionally include a display 312 configured to display a view of the working volume such as a view from the camera 302.

The printer 300 may include a sensor 314 for capturing three-dimensional data from an object in the build volume of the printer. A variety of suitable sensors are known in the art, such as a laser sensor, an acoustical range finding sensor, an x-ray sensor, and a millimeter wave radar system, any of which may be adapted alone or in various combinations to capture three-dimensional data, and the display 312 may display such three-dimensional data. The sensor 314 may generally include one or more spatial sensors configured to capture data from the object placed within the working volume. The second processor 310 (which may also or instead be the processor 304) may convert this data into a digital model of the object, and the processor 304 may be configured to operate the printer 300 to fabricate a geometrically related object as generally described below.

The processor 304 may obtain the digital model using, e.g., shape from motion or any other processing technique based upon a sequence of two-dimensional images of an object, in which case the sensor 314 may simply be one or more two-dimensional cameras. The multiple images may be obtained, for example, from a plurality of cameras positioned to provide coverage of different surfaces of the object within the working volume. In another aspect, the one or more spatial sensors may include a single camera configured to navigate around the working volume, e.g., on a track or with an articulating arm. Navigating around the working volume may more generally include circumnavigating the working volume, moving around and/or within the working volume, and/or changing direction to achieve various poses from a single position. The one or more spatial sensors may also or instead include articulating mirrors that can be controlled to obtain multiple views of an object from a single camera. In another aspect, an object may be rotated within the build volume while one or more fixed cameras capture images.

In another aspect, the one or more spatial sensors 314 may include controllable lighting that can be used, e.g., to obtain different shadowed views of an object that can be interpreted to obtain three-dimensional surface data. The processor 304 (or the second processor 310) may also provide a computer automated design environment to view and/or modify the digital model so that changes, adjustments, additions, and so forth may be made prior to fabrication.

In another aspect, a tool head 320 of the printer may be usefully supplemented with a camera 322. The tool head 320 may include any tool, such as an extruder or the like, to fabricate an object in the working volume of the printer. In general, the tool head 320 may be spatially controlled by an x-y-z positioning assembly of the printer, and the camera 322 may be affixed to and moving with the tool head 320. The camera 322 may be directed toward the working volume, such as downward toward a build platform, and may provide a useful bird's eye view of an object on the build platform. The processor 304 may be configured to receive an image from the camera and to provide diagnostic information for operation of the three-dimensional printer based upon an analysis of the image.

Thus the three-dimensional printer 300 may generally include two-dimensional or three-dimensional data capture devices to capture images from the build volume. While this approach conveniently integrates scanning capabilities with fabrication capabilities, it will be appreciated that the systems and methods described herein may also or instead employ a three-dimensional scanner that is separate from the three-dimensional printer 300 such as a stand-alone three-dimensional scanner, or in certain applications, three-dimensional data acquired from a remote resource.

Having described a variety of three-dimensional printers and three-dimensional scanners, a number of systems and methods are described below that provide computer assistance to users in designing printable three-dimensional objects.

Figure 4:
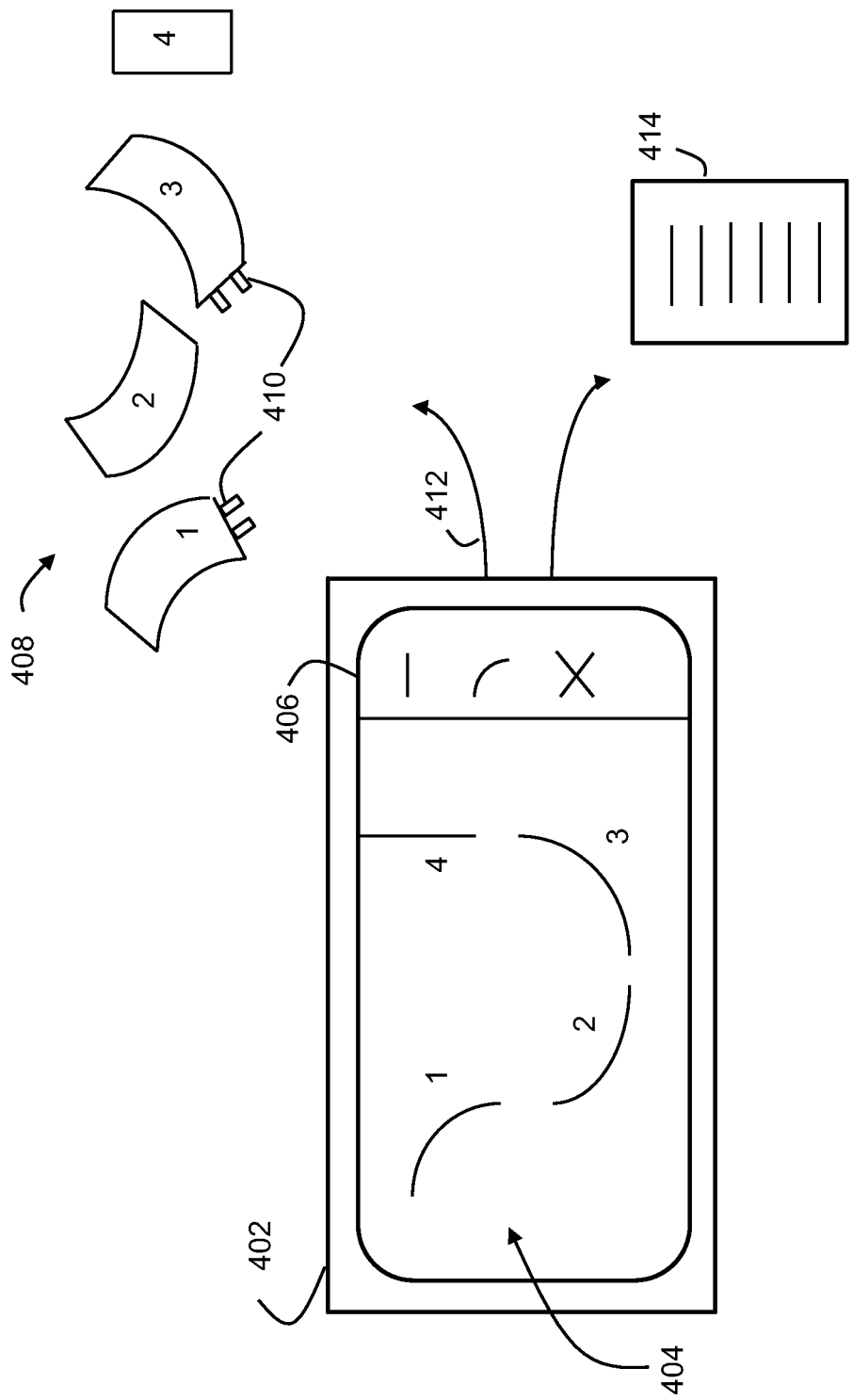
FIG. 4 shows a system for creating customizable multi-part models.

FIG. 4 shows a system for creating customizable multi-part models. In general, a user interface supports a design environment in which a user can select and arrange modular parts to create the multipart model. The parts may then be itemized and fabricated, along with assembly instructions and the like.

A graphical user interface 402 may be rendered in a computer display or the like, providing a workspace 404 such as a two-dimensional or three-dimensional design workspace and a palette 406 of parts. This may, for example, include parts for a marble run, train track, a roller coaster, or other functional device, or this may include parts for a castle, a building, or a block set (such as a castle or city block set). In another aspect, the parts may include a chassis and components for an airplane, boat, car, train, a figurine or the like. In another aspect, the parts may form a jigsaw puzzle or similar object, which the user can form of a three-dimensional model placed into the workspace. In this latter example, the palette would include different surfaces for dividers that can be placed throughout the three-dimensional model. The design workspace within the user interface may be a two-dimensional workspace, e.g., for track layouts or the like, or a three-dimensional workspace where this is useful for the parts that are manipulated in three dimensions, such as ramps and other components of a marble run.

The parts 408 may be a fixed collection of parts. For example, a train track may use a fixed set of straight lengths, curves, intersections, and switches, from which a user may construct a layout for a train track within the workspace 404. In another aspect, the parts may be partially or wholly customizable. For example, a train track may include track lengths having various inclines, radii of curvature, lengths of straight track, and so forth. The workspace 404 may thus permit creation of a single train track length with an arbitrary (or grid constrained or the like) path, followed by a placement of mechanical interfaces in any desired locations along the length of track.

The parts 408 may share a standardized mechanical interface 410 such as pegs and holes, dovetails, or the like that facilitate assembly of the parts 808 into a multipart model according to the design in the workspace 404. The standardized mechanical interface 410 may retain assembled parts by spring forces, friction fit, or any other suitable coupling forces. The standardized mechanical interface 410 may include mechanical couplings that are common to every item in the palette of parts, such as with every part having a single, identical male connector and female connector, or the interface may include a variety of different couplings for different parts. The interface may also include dimensional specifications such as width, height, or coupling placement so that each item within the palette has one or more common dimensions. In general, a variety of techniques for coupling parts are known in the mechanical arts, and may be suitably adapted as the standardized mechanical interface 410 as contemplated herein.

In general, once a multipart model is designed in the workspace, the parts 408 may be fabricated using a three-dimensional printer such as any of the printers described above as illustrated by an arrow 412. In addition, instructions 414 may be automatically or manually created including a parts list, diagrams, step-by-step assembly instructions, and so forth.

Figure 5:
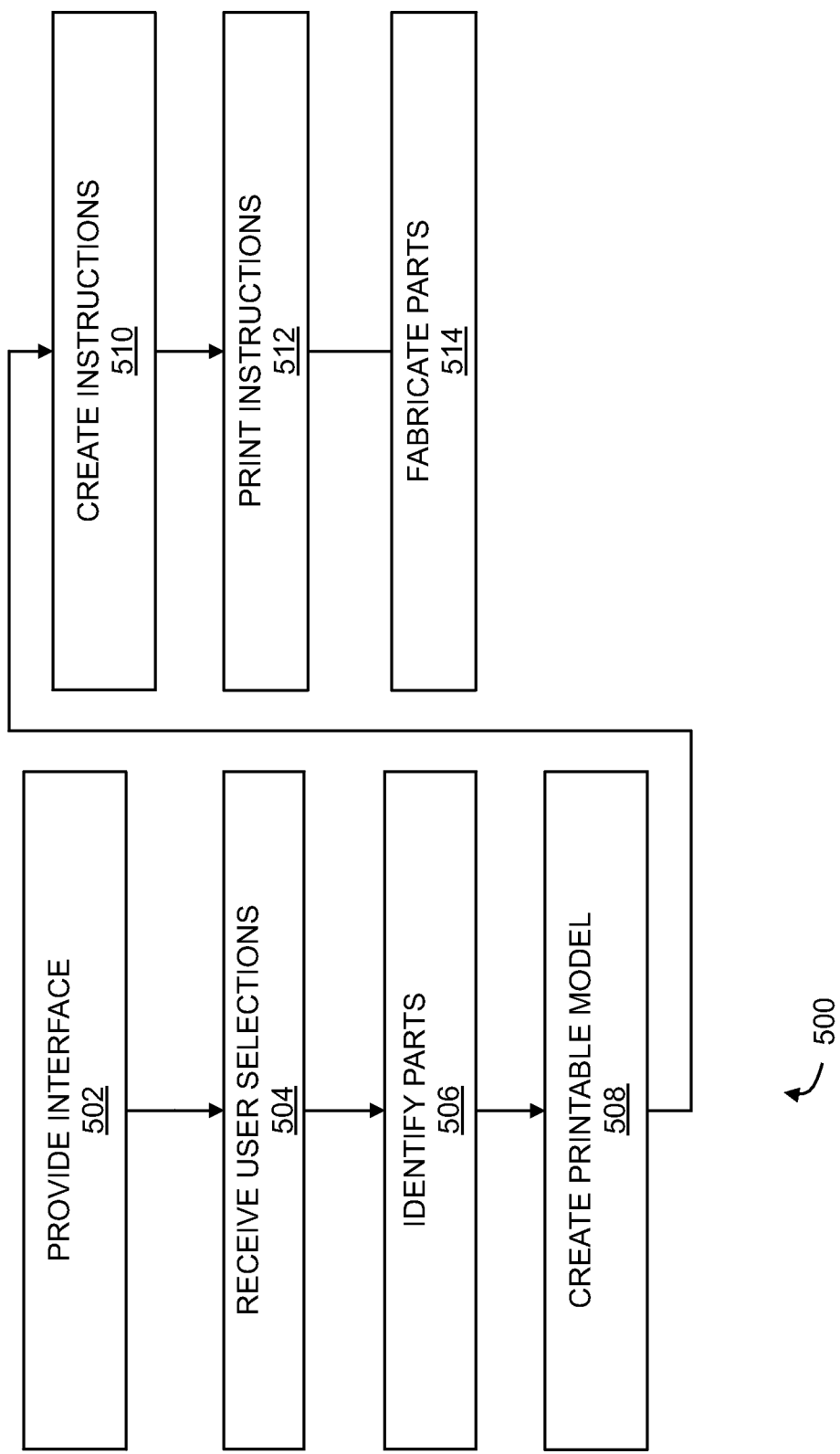
FIG. 5 shows a method for creating customizable multi-part models.

FIG. 5 shows a method for creating customizable multi-part models.

As shown in step 502, the method 500 may include providing a graphical user interface that provides a design workspace and a palette of parts that share a standardized mechanical interface, as generally discussed above.

As shown in step 504, the method 500 may include receiving a selection of two or more of the parts in the user interface, and an arrangement of the two or more parts into a multi-part model that physically couples the two or more parts using the standardized mechanical interface.

As shown in step 506, the method 500 may include providing a unique identifier for each the printable parts and incorporating the unique identifier into the printable model for the corresponding printable part, thereby providing a number of labeled parts. This identification may be performed after a user has indicated that the multipart model is complete, and the identifiers may be added automatically, e.g., with sequential numbering or lettering, or the parts may be manually labeled with user-provided reference names. In one aspect, the parts may be labeled with an intended order of assembly or any other suitable numbering scheme.

As shown in step 508, the method 500 may include creating a printable model of each one of the two or more parts, thereby providing a printable kit comprising printable parts that can be assembled into the multi-part model. Creating the model may include creating a model of a container for the two or more parts, which may be included in the model of the container in the printable kit.

The printable model may, for example be an STL (stereolithography) file or other three-dimensional model that can be readily processed by a three-dimensional printer, or the printable model may be machine instructions such as g-code or other machine-ready code that can be directly executed by the three-dimensional printer.

As shown in step 510, the method 500 may include creating instructions for assembling the multipart model.

This may, for example, include creating an inventory list identifying each of the printable parts in the multi-part model, or this may include creating instructions to assemble the printable parts into the multi-part model. Creating instructions may also include creating one or more graphical assembly diagrams providing graphical instructions to assemble the printable parts into the multi-part model. Thus for example, a diagram may show the assembled model, or a number of diagrams may show sequential assembly steps, each adding one or more parts to the assembly. The graphical assembly diagram(s) may include a unique identifier for each printable part, such as the identifiers described above. By incorporating these identifiers into the parts themselves (i.e., into the three-dimensional model of each part) and by concurrently incorporating these identifiers into one or more graphical assembly diagrams, the user can be provided with convenient visual cues for assembly of the multipart model according to the design As shown in step 512, the instructions may be printed using, e.g., a two-dimensional printer.

As shown in step 514, the method may include transmitting the printable parts to a three-dimensional printer such as any of the printers described above for fabrication. The printable kit may also or instead be stored on removable media such as a flash drive for the user, such as where the user interface is a kiosk or the like at a retail location. In another aspect, the printable kit may be stored on a web server or the like, and the user may be provided with a link, e.g., by e-mail, to a location where the printable kit can be downloaded. Where the user is at a location with a conveniently available three-dimensional printer, the user may simply transmit the parts of the printable kit to the printer, either as a group or as individual print jobs.

Figure 6:
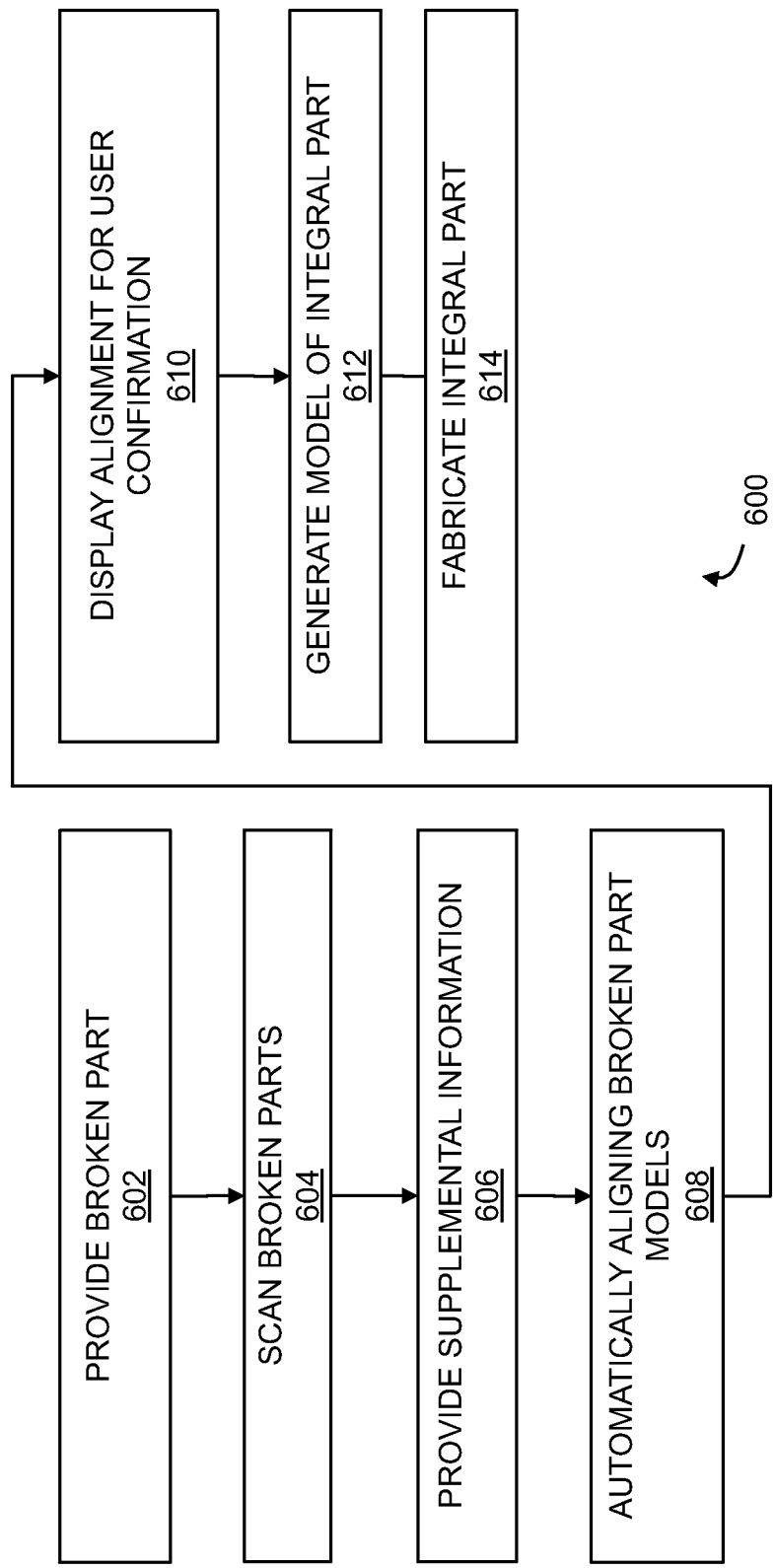
FIG. 6 shows a method for part repair.

FIG. 6 shows a method for part repair. In general, an integral part that has been broken into two or more parts may be rebuilt using scans of the two or more parts, along with other information such as material properties or dimensions of the integral part, which can be used to automatically realign the broken parts even in the presence of plastic deformation or the like. The following steps may be realized in a user interface that interactively guides a user through a sequence of steps with a scanner and printer to yield a new integral part.

As shown in step 602, the method 600 may include providing a broken part having a number of pieces including a first piece and a second piece broken from an integral part. The broken part may include any number of additional pieces, such as three or more pieces, which may be processed collectively as described below.

As shown in step 604, the method 600 may include scanning the first piece and the second piece to obtain a first digital model and a second digital model. The pieces may be scanned concurrently in a single scan, or in a series of separate scans, or some combination of these, resulting in a number of digital models corresponding to the number of broken pieces of the integral part. Scanning may be performed, for example, with a CT scanner, an optical scanner, a laser scanner, or any other type of scanner suitable for obtaining three-dimensional shape data from the broken parts.

As shown in step 606, the method may include providing information about the integral part. This may include any supplemental information about the integral part useful in automatically recombining the two broken parts. For example, the information may include a drawing or a photograph of the integral part. This information may be processed to automatically align the two broken parts in a manner conforming to the original configuration of the integral part. The information may also or instead include a physical dimension of the integral part, which may similarly be employed to align any corresponding, recognizable features (such as ends of the integral piece) of the two broken parts in a manner conforming to the integral part.

In another aspect, the information may include a manual alignment of the first digital model and the second digital model. For example, a user may align the models in a user interface in any number of dimensions (i.e., one dimension, two dimensions, or three dimensions) to obtain a desired alignment without regard to the actual, physical interface between the two broken pieces. In this manner, the user can avoid alignment errors that might otherwise result from, e.g., missing pieces or plastic deformation of the broken parts. Similarly, a user may provide information about a property of a material forming the integral part, which may be used to model deformation prior to breakage and facilitate automated alignment of the broken parts.

As shown in step 608, the method may include automatically aligning the first digital model and the second digital model in an alignment to form a model of the integral part. Where a user has provided a manual alignment, this may include verifying the manual alignment according to one or more design rules, or this step may be omitted. The automatic alignment may employ an error minimization technique according to one or more criteria established using the supplemental information above, or any other suitable technique, a variety of which are known in the art.

As shown in step 610, the method 600 may include displaying the first digital model and the second digital model in the alignment and requesting a user confirmation of the alignment before fabricating the duplicate of the integral part. This provides an opportunity for the user to inspect the automatically generated alignment, and may permit manual refinement or an input of further information for an improved, automatic alignment.

As shown in step 612, the method 600 may include processing the information, the first digital model, and the second digital model to obtain a third digital model of the integral part prior to becoming broken. This may include automatic processing such as joining the first and second models according to the automatic or manual alignment and then smoothing, hole filling, or otherwise processing the resulting, third digital model to remove any computer-detectible artifacts from the combination process. Where the three-dimensional models are large, complex models, the processing may be computationally expensive. In such situations, the intermediate models may be transmitted to a remote processing resource at any one or more points during the method 600, with results returned to a local user interface for interaction by a user.

As shown in step 614, the method may include fabricating a duplicate of the integral part from the third model.

Figure 7:
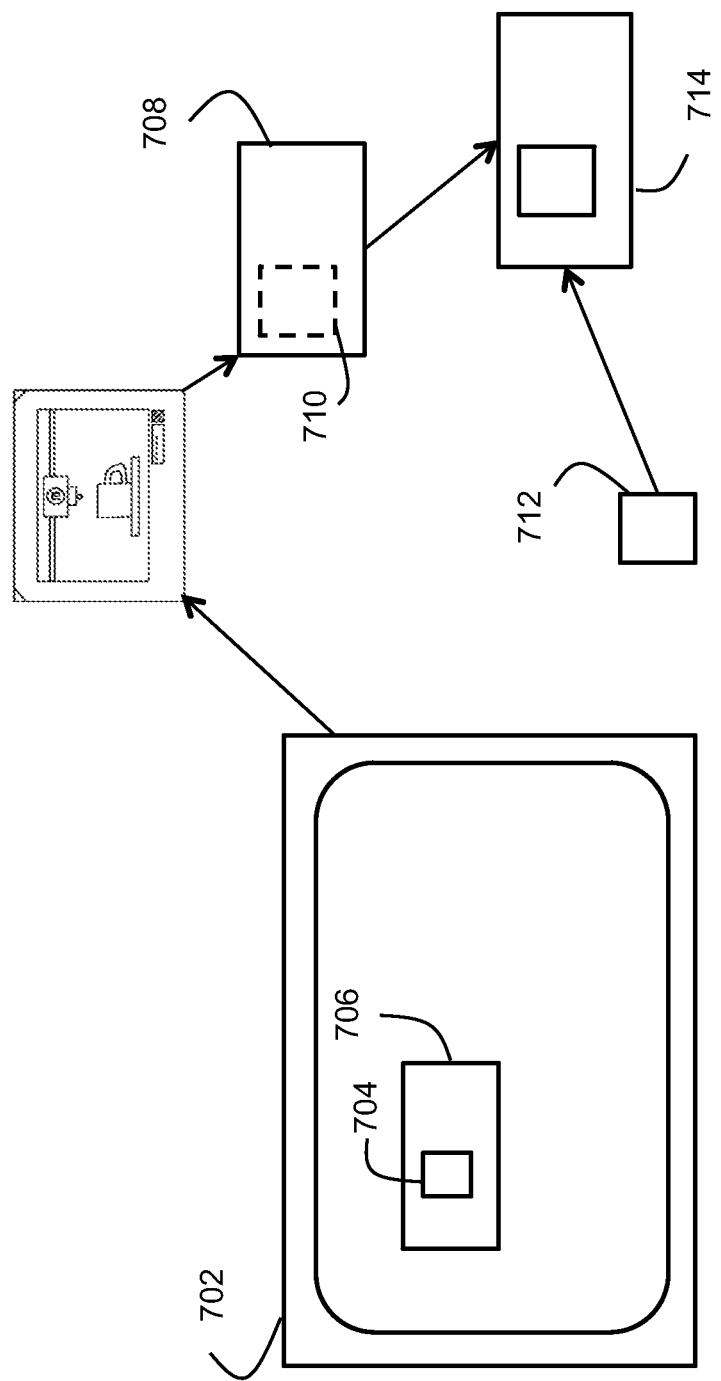
FIG. 7 shows a system for creating customizable models.

FIG. 7 shows a system for creating customizable models. A user interface 702 may provide a design environment in which functional components 704 are combined with aesthetic shells 706 to provide user-created, functioning devices. The user interface 702 may provide automation to support this task, such as by creating a suitable structural interface within the aesthetic shell 706 to receive the functional components 704. The user interface 702 may be realized using, e.g., a variety of web-based or local design tools configured for a user to customize aesthetic shells around predetermined functional components.

A physical instance of a shell 708 may then be printed at a suitable scale with space 710 to receive one or more physical instances of functional components 712. The shell 708 and functional components 712 may then be assembled to provide a customized device 714. In this manner, readily available electronic systems such as speech synthesis systems, MP3 players, sound record/playback devices, clocks, stopwatches, and so forth, may be packaged in three-dimensionally printed housings of ABS or the like that can be customized according to a variety of user inputs.

The design interface may provide various types of support for customization. For example, the design interface may indicate (by text or graphics) where a component does not fit in a cavity of an aesthetic shell, where the component would extend outside the surface of the aesthetic shell, and so forth. The design interface may automatically position a cavity for the functional component (and thus the component) based on a variety of criteria, such as best fit, maximizing distance between cavity and any external wall, placement in relation to a surface so that buttons, LED, Speakers may extend to surface, desired heft/center of gravity, optimal relationships when multiple cavities/components are called for.

For example, components such as a chipset or printed circuit board for an MP3 audio player or the like with a known form factor may be embedded into a customizable three-dimensional shape. The customizable shape may be derived from a fanciful shape such as an audio cassette player or any other suitable enclosure. A void may be created within the shape according to the form factor for the functional components. The resulting digital model may be printed or otherwise fabricated and then assembled with the components to provide a functioning device with the shape of the digital model. Various features such as buttons, speakers, microphones, displays and the like may be positioned at predetermined or user selected locations on/in the shape. A corresponding design process would include selecting the functional component(s), selecting the shape, and then creating a digital model having the shape along with suitable cavities for the functional component(s). Where the components include audio playback features, a user may also provide desired audio tracks, which may be loaded onto a memory of the functional components and provided in kit or assembled form for a fee.

Other functional components may, for example, include cameras, LED displays, buzzers, and so forth. Customizable shapes may include novelty items, paperweights, key chains, or any other shape and size of housing that a user might usefully print with a three-dimensional printer. Where audio output devices are used, the design environment may include processing related to proper function of a resulting device, such as acoustic modeling for suitable audio response. By way of further example, the device may be a watch with printable wristband links, enclosure shapes, and so forth, with mechanical or electrical timekeeping components fitting into corresponding cavities within the enclosure. Additional customization is also possible, such as by providing text or graphics as raised surfaces on an exterior of the digital model used to fabricate the various printed pieces.

The foregoing may be provided as a kit, such as a kit including one or more functional components and a digital model of an aesthetic shell on a computer readable medium (or a pointer such as a URL to a location where such a model can be retrieved). The computer-readable medium may also or instead include software configured to assist a user in fabricating a physical version of the aesthetic shell adapted to receive the functional component, and/or to customize the aesthetic shell prior to fabrication.

Figure 8:
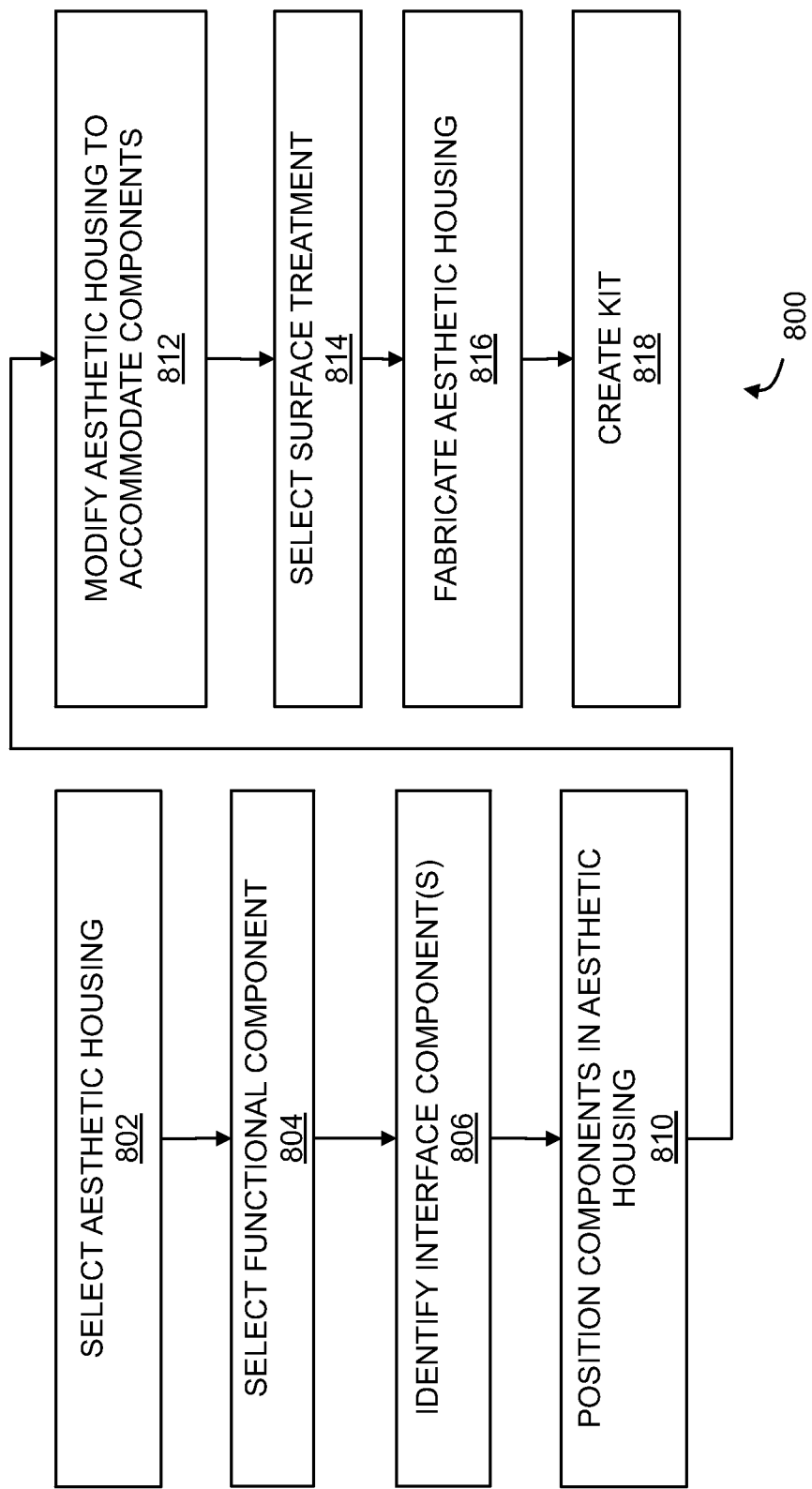
FIG. 8 shows a method for creating customizable models.

FIG. 8 shows a method for creating customizable models.

As shown in step 802, the method may include receiving a selection of an aesthetic housing in a user interface. The aesthetic housings may depend on the type of functional devices to be incorporated, or may be arbitrary. The aesthetic housing may for example be selected from a library of aesthetic models, or may be provided by a user. The aesthetic housing may include two or more parts that snap together, screw together, glue together, or otherwise assemble into a single aesthetic housing.

As shown in step 804, the method 800 may include selecting a functional component in the user interface. As noted above, this may be any of a wide variety of functional devices including any form of audio input or output device, video input or output device, processor, controller, and so forth. By way of non-limiting examples, the functional component may include an integrated circuit, a printed circuit board containing one or more integrated circuits and/or other electronics, a battery, and so forth. The user interface may provide a palette of functional devices for which the method is capable of adapting an aesthetic housing so that a user can select in a pick-and-place fashion from available components.

As shown in step 806, the method 800 may include identifying an interface component for the functional component. For example, a design system may automatically identify any buttons or the like required for input and output to control the functional device. The design system may also request user clarification when the interface component cannot be identified with certainty. For example, if a user selects a functional component with an audio output, the user may intend to couple this to a speaker within the aesthetic housing, or to an audio output jack within the aesthetic housing, and the design system may apply design rules or the like to ensure that inputs or outputs from the functional component are accounted for in a final design. By way of specific non-limiting examples, the interface component may include a button, a switch, a dial, a slider, a connector, a display, and a speaker.

As shown in step 810, the method 800 may include positioning components within the aesthetic housing. This may for example include automatically determining a position for the functional component in a digital model of the aesthetic housing. This may also include automatically or manually determining a second position for the interface component on an exterior wall of the digital model of the aesthetic housing.

In another aspect, the components may be manually positioned, or manually repositioned after an initial, automated placement. Various design rules may be automatically applied to validate a new, user-selected placement. Thus for example, this may include receiving a manual adjustment of the position of the functional component to a new position in the user interface and conditionally updating the customized model with the new position if the new position satisfies one or more design rules. Similarly, this may include receiving a manual adjustment of the second position of the interface component to a new position in the user interface and conditionally updating the customized model with the new position if the new position satisfies one or more design rules. Design rules may be any suitable design rules relating to, e.g., component clearances, structural relationship to exterior walls of the aesthetic housing, and so forth.

As shown in step 812, the method 800 may include modifying the digital model of the aesthetic housing to receive the functional component and the interface component according to the positions determined above, thereby providing a customized model. This may include a variety of modifications, which may be performed automatically, semi-automatically, or manually within the user interface. For example, modifying the digital model may include modifying the model to provide a path within the aesthetic housing to electrically couple the functional component to the interface component. This may include pathways for wires, plugs, and other connectors. As another example, this may include modifying the digital model to provide one or more mechanical attachment points to secure the functional component with one or more of a clip, a screw, and a bolt or any other attachment mechanism. Similarly, snap connectors or the like may be positioned within the housing at suitable locations. Similarly, this may include modifying the digital model to provide one or more mechanical attachment points to secure the interface component with one or more of a clip, a screw, and a bolt.

As shown in step 814, the method 800 may include selecting one or more surface treatments for the aesthetic housing. In general, the model may be aesthetically modified or customized with a variety of surface treatments such as user-selected textures or other surface treatments, or a user-provided logo, text, picture, or other visual content that can be added in three-dimensional relief to a surface of the aesthetic housing. In this manner, a resulting device can be personalized as desired by the user.

As shown in step 816, the method may include fabricating the aesthetic housing from the modified digital model, such as by transmitting the customized model to a three-dimensional printer for fabrication.

As shown in step 818, the method 800 may also or instead include creating a kit for the customized model. The kit may include the functional component(s) such as chips and other electrical devices, interface component(s) such as buttons, displays, connectors and so forth, and a copy of the customized model in a fabrication ready form (e.g., STL, g-code) stored on a computer readable medium such as a flash drive.

Figure 9:
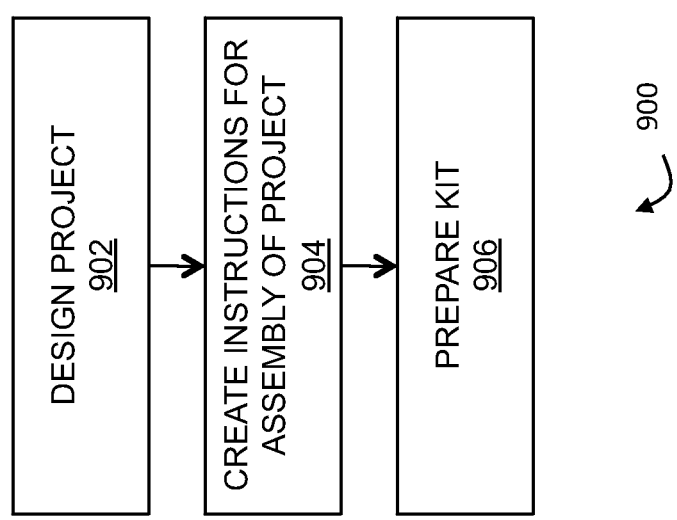
FIG. 9 shows a method for distributing project kits with printable parts and tools.

FIG. 9 shows a method for distributing project kits with printable parts and tools.

As shown in step 902, the method may begin with designing a project including a first plurality of parts and a second plurality of parts. In general, the second plurality of parts may be parts that can be fabricated using a three-dimensional printer such as any of the three-dimensional printers described above. This may, for example, be single, integral components such as gears, frames, structural and functional interconnecting members, bodies, housings, and so forth that can be described as a single three-dimensional object in a digital model and usefully fabricated from a printable material such as ABS, PLA, or polycaprolactone (PCL) plastic or the like. The first plurality of parts may also include printable objects, but preferably includes primarily parts that cannot be fabricated using three-dimensional printer. While it will be understood that three-dimensional printers have varying capabilities that change (and generally improve) over time, at present this generally includes cured rubbers, semiconductors and other circuitry, radio frequency and other communications circuitry, optics, and so forth. It will also be appreciated that some parts may optionally be fabricated using a three-dimensional printer but may for a variety of reasons (material options, strength, surface properties, thermal properties, manufacturing precision, bulk manufacturing costs, or simply convenience of the project builder) be included within the kit. This may include, e.g., washers, nuts, bolts, clips, and the like which may be fabricated with a three-dimensional printer, but which are very cheaply and conveniently commercially available in bulk.

The design may also include a tool that can be used to assemble or disassemble two parts from the first plurality of parts and the second plurality of parts. The tool may be a tool that can be fabricated using a three-dimensional printer, thus reducing the number of physical parts that will need to be shipped with a kit, and facilitating the use of customized tools for a specific project. While the tool may be a conventional tool such as a wrench, screwdriver, pliers, and the like shaped and sized for use with various printed or non-printed components of the kit, other special-purpose or custom tools may also be created. For example, crimp connectors, presses, and the like, may be printed to mechanically connect various printable parts to one another. The parts may themselves include punch outs or folding tabs that provide assembly points, and the printed tools may be shaped and sized to press against or into the kit parts to punch, fold, crease, bend, or otherwise urge the various parts into a mechanically coupled relationship with one another.

In general, the design of the project may be performed in an interactive user interface such as any of the interfaces described above, in which printable and unprinted parts may be selected from a palette and arranged into a project. In addition, tools may be specified where appropriate, which may also be printable tools for which three-dimensional models are available, or commercially available unprinted tools. While the design process may be performed in a computer-assisted environment, the design process may also be a manual design process in which a user creates a design for a project and then creates a number of three-dimensional models for use in a kit for building the project according to the design.

It will be appreciated that while the preceding description emphasizes kits with a first plurality of parts that are not printed, the first plurality of parts may also be or include printable parts. As such, in one aspect all of the parts and one or more tools may be printable parts. The first plurality of parts may, for example be parts that are optionally printed, but are readily commercially available, thus providing an option for the recipient to simply purchase some commonly available parts. In another aspect, the first plurality of parts may be parts that are printable, but for which an unprinted version with superior characteristics can be purchased. This may, for example, include small, fine detail items such as nuts and bolts, or other items for which an injection molded part, metal part, rubber part, or the like is preferable but not necessary.

As shown in step 904, the method 900 may include creating instructions for assembly of the first plurality of parts and the second plurality of parts into the project, in part using the tool(s) that can be fabricated with a three-dimensional printer. This may include step-by-step instructions at any level of detail suitable for an intended audience.

As shown in step 906, the method 900 may include preparing a kit including the first plurality of parts, the instructions, and directions for obtaining a three-dimensional model for each one of the second plurality of parts and the tool. It will be appreciated that the instructions may also or instead be provided in an online format, with only a URL or other network location identifier provided within the kit to provide a place for a kit user to retrieve instructions. In one aspect, the three-dimensional model for each one of the second plurality of parts may be stored on a computer readable medium, such as an optical drive (e.g., CD or DVD-ROM) or a USB drive or similar non-volatile memory, included in the kit. In this case, the instructions may simply identify the storage resource, which may be accessed by a user using any suitable hardware (e.g., a USB port of a computer). The directions for obtaining a three-dimensional model may include a network address for retrieving the three-dimensional model for each one of the second plurality of parts.

Where the method is implemented in an interactive user interface or the like, preparing the kit may include a number of supplemental, computer-controlled processes such as creating an inventory list, ordering physical parts that are to be included in the kit, retrieving digital models of parts that are to be provided in electronic form (e.g., as printable or fabrication-ready models), and so forth.

A variety of projects may be suitably packaged as a kit in this manner. For example, the project may include a robot of any type that includes actuatable parts that can move under user control or autonomously under control of a processor or some combination of these. The project may include a radio frequency device or other communication device that transceives data using, e.g., optical signals, radio frequency signals, ultrasound signals, and so forth. This may for example include a radio-controlled car, boat, or airplane. The project may be any electro-mechanical device or system such as a dynamo, engine, electric train, and so forth. Components that might usefully be included (as versus fabricated with a three-dimensional printer) might typically include processors or other semiconductor-based electronics, power supplies, batteries, magnets, radio frequency transceiver circuitry, rubber tires or other components using cured rubber, glass, ceramics, and so forth. Other high volume, cheaply available parts such as nuts, bolts, screws, washers, rubber bands, and so forth, may also be usefully included without regard to whether they can be fabricated using a three-dimensional printer, an emphasis being on providing models for those parts that are not readily available in commerce, or that might be scaled, colored, or otherwise customized by an end user. In addition, composite items or bulk materials such as copper wire with plastic insulating sleeves, cellophane tape, sandpaper, or epoxy might usefully be included as components not readily amenable to fabrication using current three-dimensional printing technology.

Figure 10:
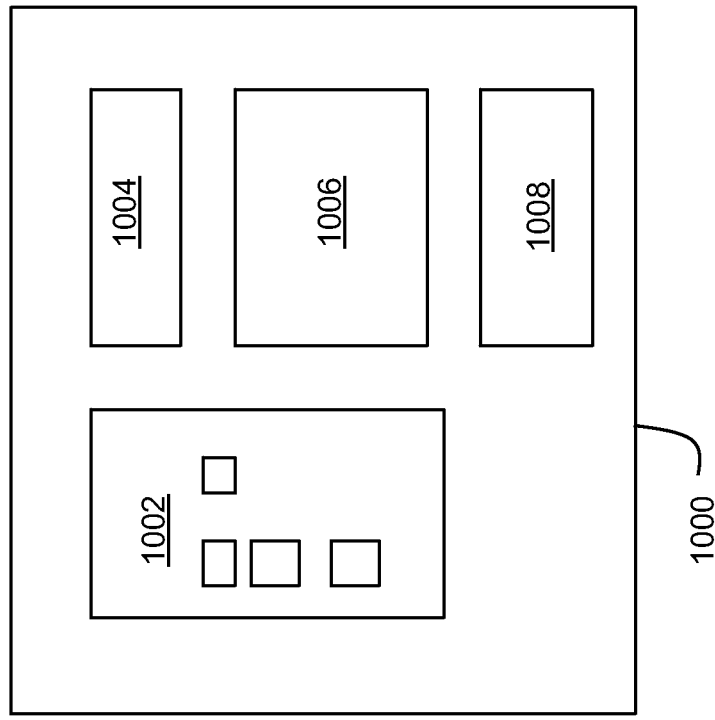
FIG. 10 shows a kit.

FIG. 10 shows a kit. In general, the kit 1000 may include packaging of any suitable form for sale, shipment, or other handling.

The kit 1000 may include a first plurality of parts 1002 such as any of unprinted parts 1002 described above, which may be provided in physical form. The kit 1000 may also include a three-dimensional model of each one of a second plurality of parts and at least one tool, stored on a non-transitory computer readable medium 1004. It will be understood that the kit 1000 may also or instead include a reference to a network location or other external resource where these three-dimensional models can be retrieved. The kit 1000 may also include directions 1006 for fabricating the second plurality of parts, and for assembling the first plurality of parts and the second plurality of parts into a project. As noted above, this may include any level of detail according to the expected audience, and may vary from an exploded view of the assembled project down to detailed, step-by-step written instructions. In another aspect, the directions may also or instead include a reference to a network location or other external resource where directions for assembly can be obtained. Finally, the kit 1000 may include bulk materials 1008 used in construction of a project such as adhesives, wire, sandpaper, and so forth.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user or a remote processing resource (e.g., a server or cloud computer) to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:
1. A method comprising:
   receiving a selection of a three-dimensional aesthetic housing in a user interface;

receiving a selection of a functional component in the user interface;

identifying an interface component for the functional component;

automatically determining a position for the functional component in a digital model of the aesthetic housing;

automatically determining a second position for the interface component on an exterior wall of the digital model of the aesthetic housing; and modifying a three-dimensional shape of the digital model of the aesthetic housing to receive the functional component and the interface component, thereby providing a customized model.

2. The method of claim 1 further comprising creating a kit including the functional component, the interface component, and a copy of the customized model stored on a computer readable medium.

3. The method of claim 1 further comprising transmitting the customized model to a three-dimensional printer for fabrication.

4. The method of claim 1 wherein the functional component includes an integrated circuit.

5. The method of claim 1 wherein the functional component includes a printed circuit board.

6. The method of claim 1 wherein the functional component includes a battery.

7. The method of claim 1 wherein the interface component includes one or more of a button, a switch, a dial, a slider, a connector, a display, and a speaker.

8. The method of claim 1 wherein the aesthetic housing includes two or more parts.

9. The method of claim 1 further comprising modifying the digital model to provide a path within the aesthetic housing to electrically couple the functional component to the interface component.

10. The method of claim 1 further comprising modifying the digital model to provide one or more mechanical attachment points to secure the functional component with one or more of a clip, a screw, and a bolt.

11. The method of claim 1 further comprising modifying the digital model to provide one or more mechanical attachment points to secure the interface component with one or more of a clip, a screw, and a bolt.

12. The method of claim 1 further comprising receiving a manual adjustment of the position of the functional component to a new position in the user interface and conditionally updating the customized model with the new position if the new position satisfies one or more design rules.

13. The method of claim 1 further comprising receiving a manual adjustment of the second position of the interface component to a new position in the user interface and conditionally updating the customized model with the new position if the new position satisfies one or more design rules.

14. The method of claim 1 further comprising receiving a user-selected surface treatment for the aesthetic housing and including the user-selected surface treatment in the customized model.

15. The method of claim 14 wherein the user-selected surface treatment includes one or more of a logo, text, and a picture.

16. A computer program product embodied in a non-transitory computer readable medium that, when executing on one or more computing devices, performs the steps of:

receiving a selection of a three-dimensional aesthetic housing in a user interface;

receiving a selection of a functional component in the user interface;

identifying an interface component for the functional component;

automatically determining a position for the functional component in a digital model of the aesthetic housing;

automatically determining a second position for the interface component on an exterior wall of the digital model of the aesthetic housing; and modifying a three-dimensional shape of the digital model of the aesthetic housing to receive the functional component and the interface component, thereby providing a customized model.

17. The computer program product of claim 16 further comprising code that performs the step of creating a kit including the functional component, the interface component, and a copy of the customized model stored on a computer readable medium.

18. The computer program product of claim 16 further comprising code that performs the step of transmitting the customized model to a three-dimensional printer for fabrication.

19. The computer program product of claim 16 further comprising code that performs the step of modifying the digital model to provide a path within the aesthetic housing to electrically couple the functional component to the interface component.

20. The computer program product of claim 16 further comprising code that performs the step of receiving a user-selected surface treatment for the aesthetic housing and including the user-selected surface treatment in the customized model.

* * * * *